United States Patent
Lee et al.

(10) Patent No.: US 9,743,237 B2
(45) Date of Patent: Aug. 22, 2017

(54) METHOD AND APPARATUS FOR PREDICTING MOBILITY BASED ON RELATIVE MOBILE CHARACTERISTICS

(71) Applicant: AJOU UNIVERSITY INDUSTRY-ACADEMIC COOPERATION FOUNDATION, Suwon, Gyeonggi-do (KR)

(72) Inventors: Jae Joon Lee, Yongin (KR); Jae Sung Lim, Suwon (KR)

(73) Assignee: Ajou University Industry-Academic Cooperation Foundation, Suwon, Gyeonggi-do (KR)

(*) Notice: Subject to any disclaimer, the term of this patent is extended or adjusted under 35 U.S.C. 154(b) by 188 days.

(21) Appl. No.: 14/588,682

(22) Filed: Jan. 2, 2015

(65) Prior Publication Data

US 2015/0195806 A1    Jul. 9, 2015

(30) Foreign Application Priority Data

Jan. 3, 2014 (KR) .................. 10-2014-0000506

(51) Int. Cl.
   | | |
   |---|---|
   | *H04W 64/00* | (2009.01) |
   | *H04W 4/02* | (2009.01) |
   | *G01S 5/02* | (2010.01) |
   | *G06N 7/00* | (2006.01) |

(52) U.S. Cl.
   CPC ........... *H04W 4/023* (2013.01); *G01S 5/0289* (2013.01); *G01S 5/0294* (2013.01); *H04W 4/028* (2013.01); *G06N 7/005* (2013.01)

(58) Field of Classification Search
   CPC ............................. H04W 64/00; H04W 4/028
   USPC ............. 455/456.1, 456.5, 456.6, 457, 404.2
   See application file for complete search history.

(56) References Cited

U.S. PATENT DOCUMENTS

| | | |
|---|---|---|
| 6,282,170 B1 | 8/2001 | Bentall et al. |
| 6,850,486 B2 | 2/2005 | Saleh et al. |
| 7,068,600 B2 | 6/2006 | Cain |
| 7,200,104 B2 | 4/2007 | Saleh et al. |

(Continued)

FOREIGN PATENT DOCUMENTS

| | | |
|---|---|---|
| KR | 10-0516121 B1 | 9/2005 |
| KR | 10-2006-0013604 | 2/2006 |

(Continued)

*Primary Examiner* — Cong Tran
(74) *Attorney, Agent, or Firm* — Mintz Levin Cohn Ferris Glovsky and Popeo, P.C.; Kongsik Kim; Jonathon Western

(57) ABSTRACT

An apparatus and method for predicting mobility based on relative mobile characteristics are disclosed herein. The method of predicting mobility based on relative mobile characteristics includes detecting, by each of a plurality of sensor nodes of a sensor network including the plurality of sensor nodes, a change in relative location with respect to an observed node; recording, by the each of the plurality of sensor nodes, information about the detected change in relative location; generating, by the each of the plurality of sensor nodes, a mathematical model for a possibility of approach of the observed node with respect to the each of the plurality of sensor nodes using the recorded relative location change information; and predicting probabilistically, by the each of the plurality of sensor nodes, whether the observed node will approach the each of the plurality of sensor nodes using the mathematical model.

10 Claims, 11 Drawing Sheets

(56) References Cited

U.S. PATENT DOCUMENTS

| | | |
|---|---|---|
| 7,263,063 B2 | 8/2007 | Sastry et al. |
| 7,319,878 B2 | 1/2008 | Sheynblat et al. |
| 7,551,552 B2 | 6/2009 | Dunagan et al. |
| 7,639,615 B2 | 12/2009 | Shinomiya |
| 7,710,860 B2 | 5/2010 | Kano |
| 7,756,617 B1 * | 7/2010 | Cluff .................. G07C 5/0858 340/476 |
| 7,957,324 B2 | 6/2011 | Fan et al. |
| 8,543,132 B2 | 9/2013 | Nam et al. |
| 8,570,872 B2 | 10/2013 | Wiley et al. |
| 2006/0239291 A1 | 10/2006 | Birchler et al. |
| 2007/0135134 A1 | 6/2007 | Patrick |
| 2008/0146172 A1 | 6/2008 | Makhlouf et al. |
| 2009/0046678 A1 | 2/2009 | Lee et al. |
| 2009/0075634 A1 * | 3/2009 | Sinclair ............. H04M 1/72572 455/414.1 |
| 2009/0141656 A1 | 6/2009 | Fan et al. |
| 2011/0119024 A1 | 5/2011 | Nam et al. |
| 2012/0071170 A1 | 3/2012 | Cho et al. |
| 2016/0219208 A1 * | 7/2016 | Horesh ............. H04N 5/23219 |

FOREIGN PATENT DOCUMENTS

| | | |
|---|---|---|
| KR | 10-0659351 B1 | 12/2006 |
| KR | 10-0701351 B1 | 3/2007 |
| KR | 10-0821301 B1 | 4/2008 |
| KR | 10-0957215 | 5/2010 |
| KR | 10-0969465 | 7/2010 |
| KR | 10-0969465 B1 | 7/2010 |
| KR | 10-0982439 B1 | 9/2010 |
| KR | 10-2010-0137857 | 12/2010 |
| KR | 10-1003689 | 12/2010 |
| KR | 10-1092089 | 12/2011 |
| KR | 10-1136375 B1 | 4/2012 |

* cited by examiner

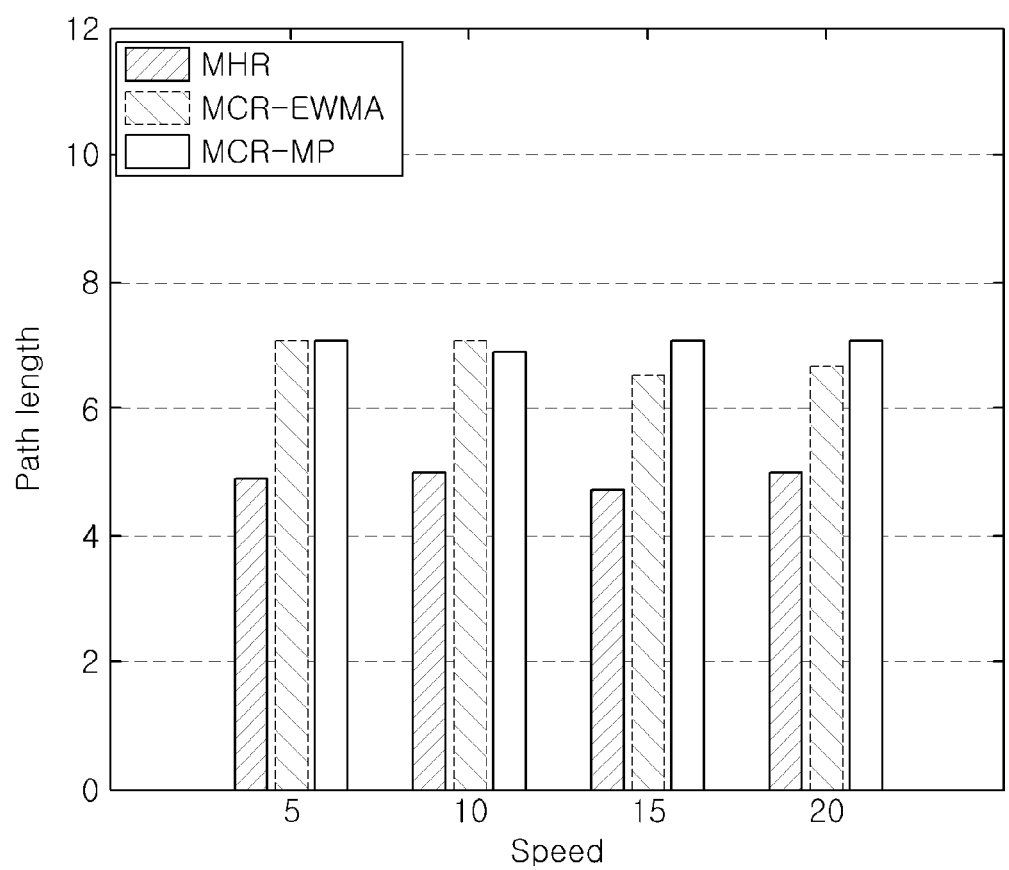

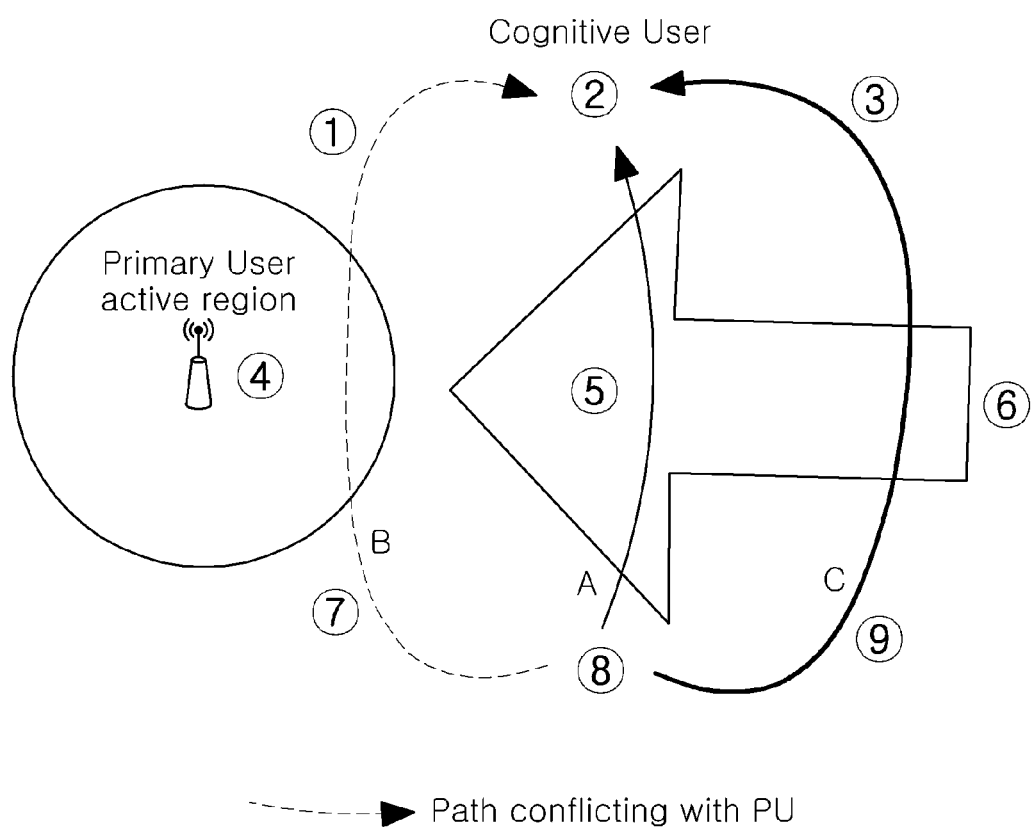

alternate paths

METHOD AND APPARATUS FOR PREDICTING MOBILITY BASED ON RELATIVE MOBILE CHARACTERISTICS

CROSS-REFERENCE TO RELATED APPLICATION

This application claims under 35 U.S.C. §119(a) the benefit of Korean Application No. 10-2014-0000506 filed Jan. 3, 2014, which is incorporated herein by reference.

TECHNICAL FIELD

The present invention relates to routing technologies based on sensor network with calculation of a risk level. More specifically, the present invention relates to a risk management by prediction. The present invention may be applied to a sensor network and/or cognitive radio network.

BACKGROUND ART

To track the location of a mobile device or a user having mobility (hereafter referred to as the "mobile user") or predict the moving direction thereof, existing studies and conventional technologies utilize location information. Most technologies input grid location information, the location information of a base station or the like into a mathematical model, analyze a location, and then predict future mobility. Furthermore, using a centralized analysis method, a central system collects individual pieces of location information, performs analysis and prediction, and then provides the results of the analysis and the prediction to a corresponding base station or a mobile user as required.

The above conventional method has the following problems. First, the location information of a mobile user is a massive amount of data. To analyze and predict a location using such a massive amount of data, a considerably lengthy analysis processing time is required. Accordingly, it may be difficult to rapidly determine a location, and a real-time service designed to predict a location and transfer the results of the prediction may suffer from delay. Second, to analyze and store a massive amount of location information, required storage capacity and processing costs increase. Third, in the case of a centralized method, a large amount of data traffic is incurred, so that high data transmission and reception costs and traffic overload are incurred.

In response to this, Korean Patent No. 10-0969465 entitled "Method of Measuring Location of Mobile Node on Wireless Sensor Network" discloses an example of a method in which each node calculates a relative location using a distributed measurement/analysis method, rather than a centralized measurement/analysis method.

This prior art uses a distributed measurement/analysis method in a wireless sensor network. The prior art measures a location using the strength of a signal received from a reference node, that is, a reference for location, time of arrival (TOA), time of flight (TOF), time difference of arrival (TDOA), angle of arrival (AoA), etc., and a weight for each reference node is assigned based on the number of reference nodes and a virtual measured distance, thereby making initially set virtual location information accurate.

Although this method can accurately measure the location of each sensor node, it is problematic in that it cannot be easily applied to a network including mobile sensor nodes because an excessively long time is required due to the iterations of the process of acquiring the accurate location of each sensor node, etc.

Meanwhile, Korean Patent No. 10-1136375 entitled "Method and Apparatus for setting up Routing Path in Multi-hop Network" discloses a routing technology for acquiring minimum location-related information required for decision making, such as routing, etc., rather than acquiring accurate location information, unlike the above-described prior art, and attempting to avoid a failure element. This prior art presents a technology that determines a path along which a communication failure is expected to occur based on the mobile characteristics of a communication failure element and adaptively sets up a stable routing path.

This prior art proposes a technology in which a node that determines that there is a communication failure transmits a message providing notification of the communication failure to neighboring nodes within a predetermined hop count range and each of the neighboring nodes that has received the message providing notification of the communication failure acquires the mobile characteristics of a communication failure element based on the notification message and sets up a routing path again based on the mobile characteristics of the communication failure element. In this case, each sensor node does not determine the accurate location of the communication failure element, but each sensor node determines whether it is located with a communication failure range related to the communication failure element (that is, whether it is suffering from a communication failure) first and then notifies adjacent nodes of the results of the determination via a message. Other nodes may acquire the range of influence of the communication failure element and the possibility of approach of the communication failure element based on the notification message from the node suffering from the communication failure (a failed node) and a hop count with respect to the failed node.

Although this prior art is an effective technology that rapidly acquires only location information required for routing (that is, the range of influence of a communication failure element and the possibility of approach thereof, rather than accurate location information) and attempts to achieve successful routing, it has the following disadvantages. First, adjacent nodes cannot accurately determine location relationships with a communication failure element but can determine only hop counts because this conventional technology is based on a multi-hop network. Second, it is difficult to prepare for the influence of a communication failure element because location information can be acquired only from nodes that have been suffering from a communication failure element.

As a result, there is a need for the development of a distributed location measurement method that is more efficient than the above-described conventional technologies.

SUMMARY OF THE DISCLOSURE

Accordingly, the present invention has been made keeping in mind the above problems occurring in the prior art, and an object of the present invention is to provide a method and apparatus for predicting mobility based on relative mobile characteristics.

An object of the present invention is to efficiently extract only required information at a cost lower than the costs of conventional technologies, mathematically model the extracted information, and then accurately predict the possibility of approach of an observed node.

Furthermore, an object of the present invention is to provide a method and apparatus for predicting mobility, which can be applied to various types of networks without limitations on the types and range of applicable networks, unlike the conventional technologies. The present invention can be applied to any type of network as long as each node of the network has independent computational processing capability and transmission and reception capability. In particular, the conventional technologies consider an observed node to be a target of avoidance, and evaluate the possibility of approach with respect to an observed node as a risk in terms of communication. In contrast, an object of the present invention is to provide a method and apparatus for predicting mobility, which can be also applied to a case where the approach of an observed node is considered to be a preferred event.

That is, an object of the present invention is to provide a method and apparatus for predicting mobility, which can be applied to not only a case where an observed node is a target of avoidance and but also a case where an observed node is a target of preference.

In accordance with an aspect of the present invention, there is provided a method of predicting mobility based on relative mobile characteristics, including detecting, by each of a plurality of sensor nodes of a sensor network including the plurality of sensor nodes, a change in relative location with respect to an observed node; recording, by the each of the plurality of sensor nodes, information about the detected change in relative location; generating, by the each of the plurality of sensor nodes, a mathematical model for a possibility of approach of the observed node with respect to the each of the plurality of sensor nodes using the recorded relative location change information; and predicting probabilistically, by the each of the plurality of sensor nodes, whether the observed node will approach the each of the plurality of sensor nodes using the mathematical model.

The sensor nodes having a network function or a sensing function may monitor a change in the relative mobile characteristic of the observed node. The mobile characteristic of a mobile object may include the speed, direction, etc. of the mobile object. A moving object may be the observed node or each sensor node. Accordingly, the relative mobile characteristic may include information about whether the distance between the observed node and the sensor node increases or decreases and information about an approaching or moving-away speed. Each node may determine the relative mobile characteristic using its own sensing function or the sensing functions of neighboring nodes.

The sensor nodes may record changes in relative mobile characteristic over time. Each of the sensor nodes may record changes in relative mobile characteristic over time, may generate a prediction model for a change in relative mobile characteristic based on the recorded changes in relative mobile characteristic, and may predict a future change in relative mobile characteristic using the prediction model.

The recording may include recording the relative location change information so that information about whether the observed node is approaching or moving away from the each of the plurality of sensor nodes is included in the recorded relative location change information.

The generating may include generating a mobility state of the observed node by accumulating k pieces of relative location change information of the observed node based on changes in discrete time; generating a state diagram using combinations of a plurality of mobility states that the observed node can have; and generating a Markov model for probabilities of transition between a plurality of mobility states within the state diagram as the mathematical model.

The predicting may include predicting whether the observed node will approach using a probability of transition that a mobility state of the observed node at a current point in time will be a state in which the observed node is approaching in next time, which belongs to a plurality of mobility states within the state diagram.

In accordance with another aspect of the present invention, there is provided a method of routing for a cognitive user (CU) in a cognitive radio network, including detecting, by the CU in the cognitive radio network, a change in relative location with respect to a primary user (PU); recording, by the CU, information about the detected change in relative location; generating, by the CU, a mathematical model for a possibility of approach of the PU using the recorded relative location change information; predicting, by the CU, a possibility of approach of the PU using the mathematical model; and setting up, by the CU, a routing path for a target node based on the predicted possibility of approach of the PU.

The generating may include generating the mobility state of the PU by accumulating the k pieces of relative location change information of the PU based on changes in discrete time; generating a state diagram using combinations of a plurality of mobility states that the PU can have; and generating a Markov model for the probabilities of transition between a plurality of mobility states within the state diagram as the mathematical model.

The predicting may include predicting whether the CU will approach using a probability of transition that a mobility state of the CU at a current point in time will be a state in which the CU is approaching in next time, which belongs to a plurality of mobility states within the state diagram.

The generating may include generating an exponentially weighted moving average of a relative approaching speed of the PU as the mathematical model.

The setting up may include calculating communication costs, including the predicted possibility of approach of the PU, for paths via each of nodes adjacent to the CU; and selecting one of the paths via each of nodes adjacent to the CU as the routing path based on the calculated communication costs.

In accordance with still another aspect of the present invention, there is provided an apparatus for predicting mobility based on relative mobile characteristics, including a processor, and a memory device. The processor may include detection unit configured to detect a change in relative location between a observed node and a sensor node within a sensor network. The memory device may be configured to record information about the detected change in relative location. The processor may further include a modeling unit configured to generate a mathematical model for a possibility of approach of the observed node with respect to the sensor node using the relative location change information recorded in the memory device; and a prediction unit configured to predict probabilistically whether the observed node will approach the sensor node using the mathematical model.

The modeling unit may include a first generation unit configured to generate a mobility state of the observed node by accumulating k pieces of relative location change information of the observed node based on changes in discrete time; a second generation unit configured to generate a state diagram using combinations of a plurality of mobility states that the observed node can have; and a third generation unit configured to generate a Markov model for probabilities of transition between a plurality of mobility states within the state diagram as the mathematical model.

BRIEF DESCRIPTION OF THE DRAWINGS

The above and other objects, features and advantages of the present invention will be more clearly understood from the following detailed description taken in conjunction with the accompanying drawings, in which:

FIG. 5A through 5C are graphs illustrating the comparison and analysis of the simulation results of cases to which a Markov Prediction technique and an exponentially weighted moving average (EWMA) technique according to the embodiments of the present invention have been applied;

FIGS. 8A and 8B are diagrams illustrating a routing method in the case where a PU is stationary and CUs have mobility, which is a cognitive radio network routing method according to an embodiment of the present invention.

DETAILED DESCRIPTION OF THE DISCLOSURE

Hereinafter, embodiments of the present invention will be described in detail with reference to the accompanying drawings. In the following description, detailed descriptions of known elements or functions that may unnecessarily make the gist of the present invention obscure will be omitted. In the description of the embodiments of the present invention, specific numerical values merely correspond to specific examples.

The present invention proposes a technology in which each of the plurality of sensor nodes of a sensor network including the plurality of sensor nodes detects a change in relative location with respect to a observed node, generates a mathematical model for the possibility of approach with respect to each of the plurality of sensor nodes using the detected relative location change information, and probabilistically predicts whether the observed node will approach each of the plurality of sensor nodes.

Figure 1:
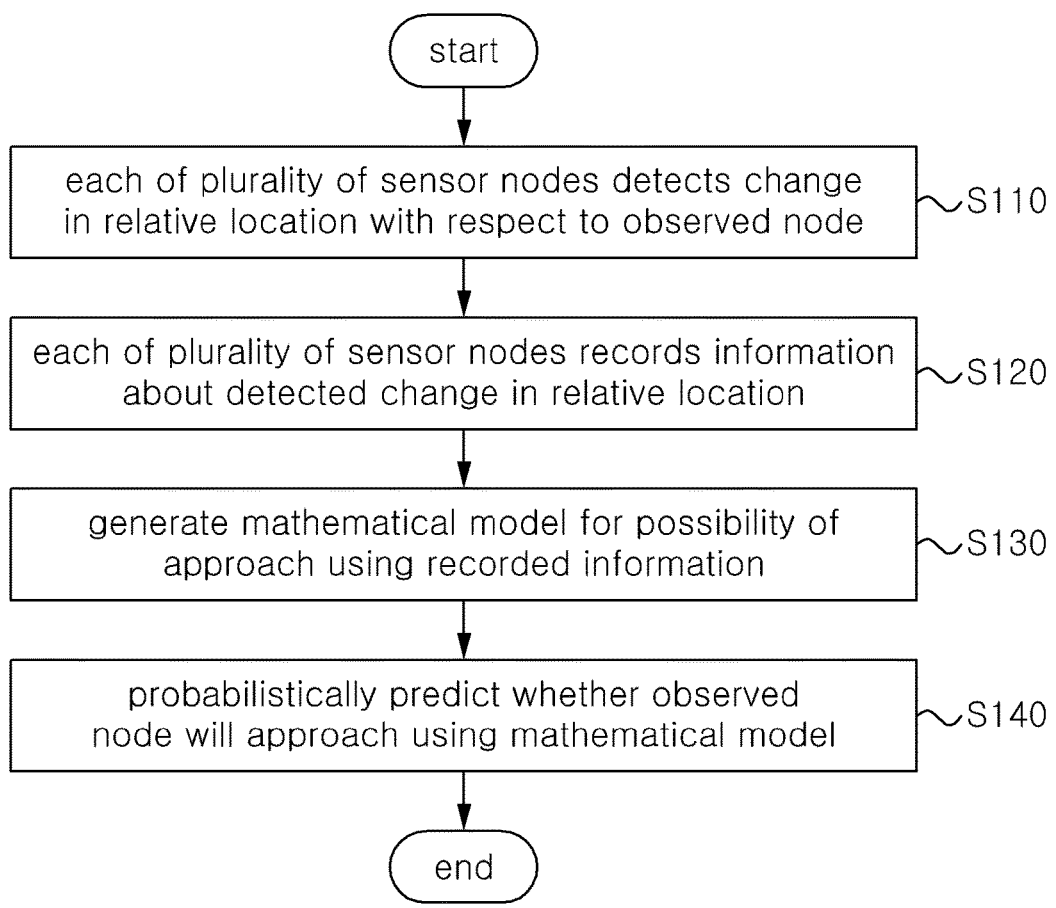
FIG. 1 is a flowchart illustrating the method of prediction of mobility based on relative mobile characteristics in a sensor network according to an embodiment of the present invention.

FIG. 1 is a flowchart showing the method of predicting mobility based on relative mobile characteristics on a sensor network according to an embodiment of the present invention.

Referring to FIG. 1, on the sensor network including a plurality of sensor nodes according to an embodiment of the present invention, each of the plurality of sensor nodes detects a change in relative location with respect to a observed node at step S110. In this case, each of the sensor nodes detects a change in relative location with respect to the observed node using the distances between the plurality of sensor nodes and the observed node and changes in the distances over time.

Furthermore, the change in the relative location of the observed node may be detected in such a manner that the location of the observed node is shared by transferring the location of the observed node to a plurality of sensor nodes within a predetermined range from the plurality of sensor nodes. A method of detecting a relative distance with respect to the observed node may use TOA, TDOA, TOF, etc., as in the above-described conventional technology. The strength of a received signal is one of the means for determining a relative distance.

From the standpoint of each of the sensor nodes, a relative mobile characteristic with respect to the observed node refers to the distance between an object (the sensor node), which evaluates relative mobility with respect to the observed node whose mobile characteristic is desired to be acquired, and the observed node and a change in the distance over time.

In this case, a distance unit that is used to determine relative mobile characteristics may vary depending on an example of method, measuring equipment or sensor for measuring a distance. For example, when accurate distance measurement can be performed using an available positioning technique, a specific length-based distance, such as a meter unit, may be used. Alternatively, when a multi-hop network is constructed between base stations or main evaluation agent nodes, a minimum hop count between a target object and a main evaluation agent may be used as a distance reference. In this case, the term "node" refers to any device that acquires or is used to acquire the relative mobile characteristics of a specific target object, such as a base station, a sensor, a mobile communication device, or the like.

The present invention is a technology that can be applied, in the same manner, to a case where an observed node has mobility, a case where an observed node is stationary and sensor nodes, that is, agents of measurement, have mobility, and a case where a relative mobile characteristic with respect to a measurement-observed node changes.

In an embodiment of the present invention, a method of acquiring relative mobile characteristics with respect to an observed node includes an event notification method and a periodic monitoring method. These methods may be used alone or in combination.

The event notification method is configured to, when an observed node is within a predetermined range from a determination agent (a sensor node), detect the aforementioned, transfer the detected information to the mobility prediction module of the determination agent node, and transfer the detected information to neighboring nodes within a predetermined range, thereby enabling the detected information to be processed in a distributed environment. When centralized processing is required, it may be possible to transmit the information to a corresponding processing system. Furthermore, when a change in the relative distance to a target object has exceeded a predetermined reference, notification of information about the change may be provided.

The periodic monitoring method is configured to detect relative mobility with respect to an observed node at predetermined time intervals. Furthermore, the periodic relative mobile characteristics information may be shared with neighboring nodes or a central processing system.

Step S120 at which each of a plurality of sensor nodes records detected relative location change information may be performed in such a manner that each of a plurality of sensor nodes constituting a distributed network records a detected change in relative location.

Furthermore, information about whether the observed node is moving away from or approaching each of the plurality of sensor nodes may be included in the relative location change information, and also information about a case where the observed node is stationary may be included in the relative location change information.

At step S130 of generating a mathematical model regarding the possibility of the observed node approaching each of the plurality of sensor nodes using the relative location change information in which information about each of the plurality of sensor nodes has been recorded, the mobility state of the observed node is generated by accumulating the k pieces of relative location change information of the observed node based on a discrete time change.

According to an embodiment of the present invention, it may be assumed that the mobility state of the observed node has three state values. Each of the sensor node may determine whether the observed node is detected within a predetermined distance range, whether the observed node is detected and also approaches each sensor node, or where the observed node is detected and also moves away from each sensor node. The result of the determination leads to one of the state values. That is, a first state value may be classified as a case where an observed node is not detected within a predetermined distance range from a sensor node (N), a second state value may be classified as a case where an observed node is approaching a sensor node (I), and a third state value may be classified as a case where an observed node is moving away from a sensor node (O). In this case, I denotes "Inward," N denotes "Neutral," and O denotes "Outward."

The state values of the mobility states of an observed node correspond to an embodiment of the present invention, and the spirit of the present invention is not limited by these state values. As an example, the state values of mobility states may be more specifically classified depending on a variable, such as the range of the distance between an observed node and a sensor node.

In the following, for ease of description, a description will be given based on the case of having three state values. The sensor node according to an embodiment of the present invention may generate a state diagram using the combinations of the three cases of a plurality of mobility states that the observed node can have.

A state diagram is a variable representative of the relative mobility between a sensor node and an observed node. A state diagram may be enriched by being combined with the concept of time-based history.

That is, although mobility states at a current point in time have only three state values, variables that a state diagram may take are further diversified when the state values of mobility states at an immediately previous point in time and the state values of mobility states at a current point in time. In this case, a k-order prediction model may be generated by including a state value at a current point in time to a state value at a (k−1)-th previous point in time.

In order to generate a k-order state diagram, the process of integrating information may be performed in such a way that each of a plurality of nodes periodically shares information recorded by itself with each other or with a central processing system, such as a base station.

In this case, a state diagram may be completed by adding the transition probabilities between a plurality of mobility states. In an example of the state diagram, the transition probability between mobility states may be mathematically calculated using a Markov model in the present specification. In this case, the transition probability is a conditional probability at which the transition between states occurs. In this case, the mobility state may be a set that has k previous and current state values as elements. That is, the mobility state may be given as $(X_t, X_{t-1}, \ldots, X_{t-k+1})$.

In an embodiment of the present invention, a Markov predictor, which is a prediction technique, is applied to mobility prediction. The Markov predictor has been widely used in many fields to predict a subsequent event with respect to successive or a series of events. Since the Markov predictor utilizes the latest part of previous information to perform prediction analysis, it is suitable for application to a distributed environment and a mobile device having limited resources.

The Markov predictor uses a conditional probability. The conditional probability P(A|B) refers to a probability at which an event A occurs when an event B has occurred.

In an embodiment of the present invention, the transition probability between mobility states may be expressed by the conditional probability of Equation 1 below:

$$P(X_{t+1}=x_{t+1}|X_t, X_{t-1}, \ldots, X_{t-k+1}) \qquad (1)$$

where t is discrete time, k is the order to a Markov model and refers to the length of the history of previous information that is used to obtain following probability information, and $X_t$ is a random variable at time t.

That is, the probability that mobility state $x_{t+1}$ occurs at time t+1 is acquired using k pieces of previous and current state value information during a period from time t−k+1 to time t. In the k-order Markov model, only k pieces of recent information including previous and current information are required, and in the k-order model, a mobility state is composed of the combination of k states.

In the mobility state diagram according to an embodiment of the present invention, a k-order mobility state may be set up, and then the transition probability between states may be acquired using the Markov model.

Step S140 at which each of the plurality of sensor nodes probabilistically predicts whether the observed node will approach each of the plurality of sensor nodes using the mathematical model may be performed using a Markov prediction technique. Each of the plurality of sensor nodes may predict whether the observed node will approach using the probability that the mobility state of the observed node at a current point in time will be a state in which the observed node is approaching in next time, which belongs to a plurality of mobility states within the state diagram.

In this case, each of the plurality of sensor nodes may be a shop, a bus stop, a repeater, a relay, a Wi-Fi terminal, or the like. In an embodiment, each of the plurality of sensor nodes may be a CU on a cognitive radio network.

In an embodiment of the present invention, when the sensor node is the communication equipment of a specific shop, the observed node corresponds to a specific customer, and the sensor node may use the prediction method of the present invention to predict whether the specific customer will approach the shop. Alternatively, when the sensor node is the communication equipment of a bus stop, the observed node may be a bus, and the bus stop may use the prediction method of the present invention to predict whether the specific bus will approach the bus stop.

In the case of a cognitive radio network, the sensor node may be a CU, and the observed node may be a PU. A conventional technology for finding a PU through the cooperation of CUs in a cognitive radio network focuses on finding a communication resource, that is, a frequency band or a time slot, that is not being used by a PU, rather than a location-based routing technology. It can be seen that the conventional cooperative finding technology has been chiefly used in a physical layer. Unlike this, in the case of a cognitive radio network according to an embodiment of the present invention, CUs may perform routing via communication paths, reducing communication costs, based on the possibility that the PU will approach. That is, the distributed/cooperative computation technology of the present invention is related to a data link layer or a network layer.

Furthermore, according to another embodiment of the present invention, the observed node may be a target of preference, not a target of avoidance, for the sake of the sensor node. For example, the sensor node may be the communication terminal of a vehicle or a mobile terminal, and the observed node is an access point (AP) of a wireless communication network. In this case, the design may be made such that each sensor node sets up a routing path toward the AP based on the distance to the AP and the possibility of approach. That is, in this case, the setup of a routing path through the AP reduces communication costs, thereby achieving effective communication.

Figure 2:
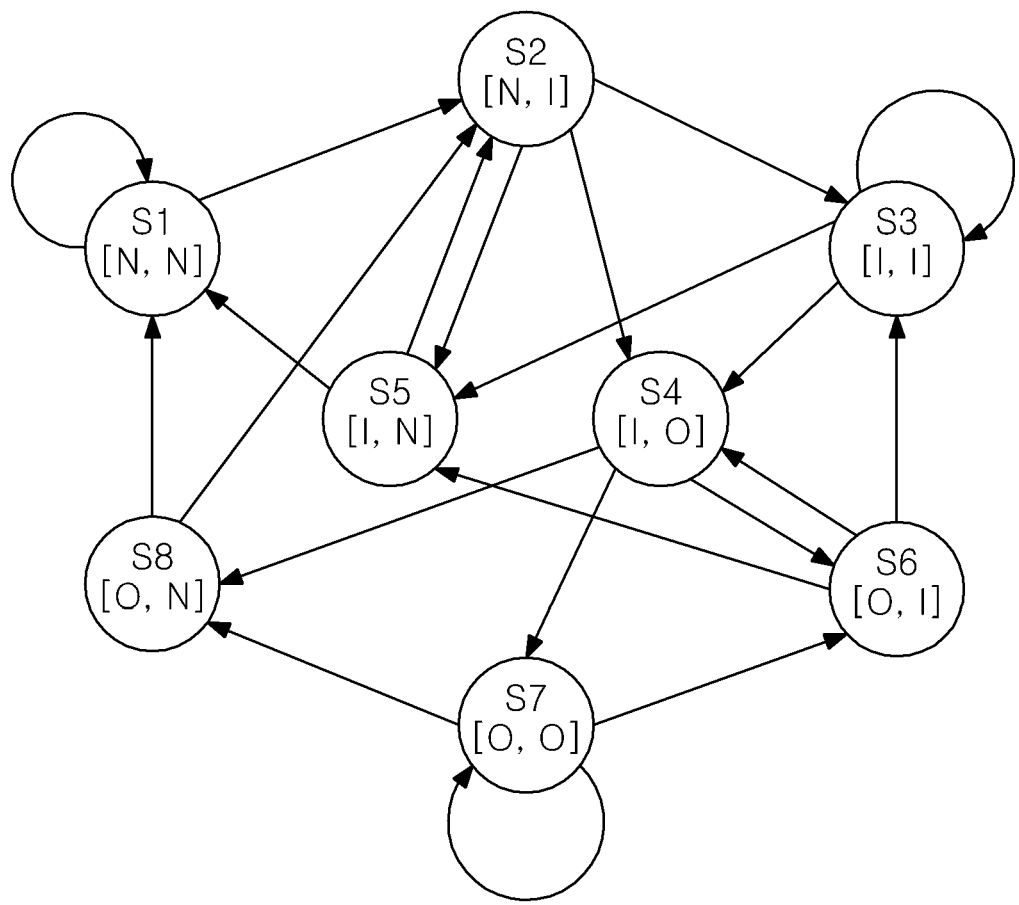
FIG. 2 is a diagram illustrating a state diagram as a tool for predicting the mobility of an observed node based on a Markov prediction technique according to an embodiment of the present invention.

FIG. 2 is a diagram illustrating a state diagram as a tool for predicting the mobility of a observed node based on a Markov prediction technique according to an embodiment of the present invention.

Referring to FIG. 2, the state diagram of the Markov model in the case of k=2 is illustrated. That is, a mobility state with respect to the observed node, which is determined by each sensor node, is given as a set of a current state value [N, I, O] and an immediately previous state value [N, I, O].

In this case, for ease of description, each state value may be presented in the form of [N: No detection at a current point in time, I: approaching a plurality of nodes, O: moving away from a plurality of nodes].

A 2-order mobility state that may be generated using a state value [N, I, O] may have a total of nine combinations of state values. The mobility state of [N, I] means that the observed node was outside the detection range of the sensor node at a previous point in time (N) and the observed node is detected approaching the sensor node at a current point in time (I). That is, this is generalized as $[X_{t-1}, X_t]$.

In this case, since the possibility that the mobility state actually has the state value combination [N, O] is very low, the mobility state is represented using eight state value combinations. [N, O] means the case where the observed node was not detected at a previous point in time and the observed node is moving away from the sensor node at a subsequent point in time. It is not easy that the state value combination [N, O] appears between nodes that are moving at a common speed.

Accordingly, the eight mobility states illustrated in FIG. 2 are as follows:
{[N, N], [N, I], [I, I], [I, O], [I, N], [O, I], [O, O], [O, N]}

The mobility state may include all theoretically possible state value combinations as described above, or only combinations that are actually possible when the moving speed of the sensor node or the observed node is taken into account may be picked out and selected. Such a 2-order mobility state may be considered to include interference element moving characteristics at a previous point in time and interference element moving characteristics at a current point in time (or a subsequent point in time). That is, the 2-order mobility state may be interpreted as a state that is constructed by figured by combining mobile characteristics at two successive points in time.

When the mobility state [N, O], that is, the possibility of transition from Neutral to Outward, is excluded, the initial state of the observed node viewed from the sensor node may be [N, N] or [N, I].

In the state diagram of FIG. 2, the arrows represent state transition between mobility states. In a Markov model, actual events occur over time, and the statistics of occurred events are accumulated, thereby updating the probability of state transition.

In studies using a conventional Markov predictor, states are defined and modeled using location information. In this case, a state is required for each location, and the difference in the number of states and the granularity of prediction may significantly increase depending on the size of a location unit.

In the present invention, each node has a role of determining agent, and uses the relative mobile characteristic of the target object as a state in the Markov model. In the present invention, a state needs not to be mapped for each location. For example, it is sufficient if only mobility state information at the most recent k points in time is accumulated and recorded. Accordingly, temporal and spatial resource consumption that may occur in prediction processing using location information as a state, that is, a conventional method, can be considerably reduced.

In embodiments of the present invention, relative mobile characteristic with respect to the observed node may be defined in various ways. For example, the relative mobile characteristic may be defined using a change in relative distance or may be defined in detail by adding a change in direction to a change in distance.

In an embodiment of the present invention, the relative mobile characteristic may be represented using only three state values, that is, Neutral, Inward and Outward, as described above, and thus resources required for computation and storage can be reduced.

In an embodiment of the present invention, an order-2 Markov model is used for a prediction technique. Each state includes two states, that is, a previous interference element moving characteristic state and a current interference element moving characteristic state. As an example, [Neutral, Inward] is a state in which a target object was not detected and the target state is detected approaching at a subsequent point in time.

In an embodiment of the present invention, the relative mobile characteristics of the observed node are recorded, and then the Markov model is continuously updated when an event occurs. In this case, the conditional probability is also updated.

In this case, a probability-based service may be provided in accordance with the mobile characteristics of observed nodes each having mobility based on probability information acquired from the above-described mathematical model.

Furthermore, a observed node having a specific mobile characteristic probability may be extracted from among a plurality of observed nodes, and then may be used for the operation of a service and a system.

Although a mobility state diagram with respect to a single observed node has been illustrated in FIG. 2, a specific sensor node may record and monitor a mobility state diagram with respect to a plurality of observed nodes as required in another embodiment of the present invention. In this case, observed nodes having a strong possibility of approaching a location within a predetermined range around a specific sensor node may be extracted from among a plurality of observed nodes, and then the operation of a service or a system may be adjusted accordingly.

Figure 8B:
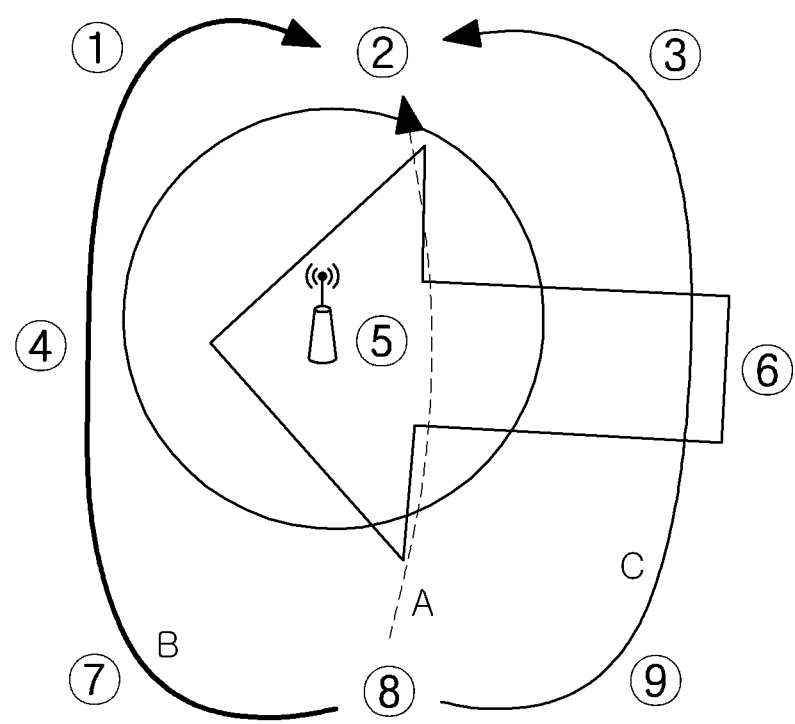

As an embodiment to which the Markov model of FIG. 2 has been applied, a mobility-based routing technique between a PU and a CU in a cognitive radio network is described using FIG. 8.

FIG. 8 is a diagram conceptually illustrating a routing method in the case where a PU is stationary and CUs (CUs) have mobility, which is a cognitive radio network routing method according to an embodiment of the present invention.

Referring to FIG. 8, a case where nine CU nodes are approaching the PU in a situation in which the PU is stationary is illustrated.

(a) At first time T1 (=t), CU node 4 is located within the range of influence of the PU. That is, since the CU node 4 is restricted by the influence of the PU, communication via the CU node 4 has a strong possibility of communication failure, which causes increased communication costs.

In this case, in the case of transmitting a message from CU node 8 to CU node 2, path A from CU node 8 via CU node 5 to CU node 2, path B via CU node 4, and path C via CU node 6 may be selected. At this time, the path B is a path having a high communication cost due to a relative location relationship with the PU.

(b) At T2 (=t+1) after the passage of a predetermined time, the CU nodes have moved to the left, and thus CU node 5 is located within the range of influence of the PU. In this case, path A has the highest communication cost due to a relative location relationship with the PU, and paths B and C are relatively advantageous routing paths.

Although the path A is excellent at T1 when an intuitive determination is made under a situation, such as that of FIG. 8, it will be reasonable to select the path C because it is expected that the communication cost of the path A will increase at T2 when a relative mobile characteristic with respect to the PU is taken into account.

In an embodiment of the present invention, a routing technique for selecting the path C as an optimum routing path over a period from T1 to T2 in a cognitive radio network environment, such as that of FIG. 8, using the state diagram of the Markov model, such as that described in conjunction with FIG. 2.

In the cognitive radio network environment of FIG. 8, a state at time t may be expressed by Equation 2 below in order to apply the k-order Markov model:

$$S(t) = [X_{t-k+1}, X_{t-k+2}, \ldots, X_t] \quad (2)$$

The conditional probability $P(X_{t+1}=x_{t+1}|S(t))$ means the probability that a subsequent state value becomes $x_{t+1}$ when a current state is $S(t)$.

Since the presence of the observed node PU is a risk factor, increasing communication costs, in a cognitive radio network, the possibility of approach to the PU may be considered to be a risk level in communication. When a current state obtained by evaluating the relative approach feature of a specific node i with respect to the PU is $S_i(t)$, a communication risk level $r_i^{(M)}(t)$ via the Markov model may be expressed by Equation 3 below:

$$r_i^{(M)}(t) = \sum_{j=S_i(t), k \in S} w_{jk} P_{jk} \quad (3)$$

$P_{jk}$ is the probability of transition from a mobility state j to k, and $w_{jk}$ is a weight for $P_{jk}$ that is assigned to adjust the interference risk level of each state transition.

In Equation 3, j is the current mobility state $S_i(t)$ of the node i, and k is an index representative of each mobility state within an eight-state set S that may be present in a second-order Markov model. The set S is given as Equation 4 below:

$$S=\{[N,N],[N,I],[I,I],[I,O]\},[I,N],[O,I],[O,O],[O,N]\} \quad (4)$$

As an embodiment of the present invention, the simplest method for setting the weight $w_{jk}$ may be a model in which only the probability that a subsequent state value transitions to Inward from a current state is incorporated into the calculation of a risk level and the remaining transition probabilities are all ignored.

In this case, the weight $w_{jk}$ is given as Equation 5 below:

$$w_{jk}=0, \text{ if } j \in \{[X_t, X_{t+1}] | X_{t+1} \neq I\} \quad (5$$

That is, a model in which 0 is assigned to all the transition in which the mobility state value of the node i is not Inward at the subsequent point t+1 of $S_i(t)$ as $w_{jk}$ may be applied.

The process of calculating the relative mobile characteristics of some CU nodes with respect to the PU when the above weight model is applied to the cognitive radio network of FIG. 8 is illustrated in Table 1 below:

TABLE 1

| Node | $d_i(t - 1)$ | $d_i(t)$ | $d_i(t + 1)$ | $S_i(t)$ | $S_i(t + 1)$ |
|---|---|---|---|---|---|
| 1 | 2 | 1 | 2 | [I, I] | [I, O] |
| 3 | N/A (4) | 3 | 2 | [N, I] | [I, I] |
| 4 | 1 | 0 | 1 | [I, I] | [I, O] |
| 5 | 2 | 1 | 0 | [I, I] | [I, I] |
| 6 | 3 | 2 | 1 | [I, I] | [I, I] |

$d_i(t)$ is the relative distance of the specific node i with respect to the PU at time t.

Referring to Table 1, CU node 1 has a relative distance of 2 with respect to a PU at time (t−1), and is spaced apart from the PU by 1 at time t. At subsequent time (t+1), the distance between the CU node 1 and the PU increases to 2 again. Accordingly, the CU node 1 has an Inward state value at time t because the CU node 1 is approaching the PU, and has an Outward value at time (t+1) because the CU node 1 is moving away from the PU.

According to this, the communication cost of node 4 is highest at time t, but the risk level at which the communication cost of the node 4 will increase decreases to 0 after time (t+1).

Since the transition probability of having an Inward state value can be predicted by referring to the current state and k previous states of each node based on the Markov model, the future communication risk level of each node can be evaluated. In an embodiment of the present invention, communication costs are calculated by incorporating the Markov predictor-based communication risk level of each node into the setup of a path from node 8 to node 2, and a routing path having the lowest cost is acquired.

In this case, in a cognitive radio network, such as that of FIG. 8, approach to the observed node PU means communication failure, that is, an increase in risk level. In contrast, according to another embodiment of the present invention, the observed node may be an AP of a wireless network, such as a Wi-Fi network or the like, in which case approach to the observed node may mean a decrease in communication risk level because the communication cost will decrease as approach to the observed node is further performed. In this case, a routing technique of passing through a sensor node adjacent to a observed node is preferred in order to reduce communication costs.

According to another embodiment of the present invention, an exponentially weighted moving average (EWMA) technique may be applied in place of the state diagram and Markov predictor of FIG. 2 in the cognitive radio network of FIG. 8.

The EWMA technique is a technology that is widely used to predict trend and smooth short-term fluctuations. In the EWMA technique adopted in an embodiment of the present invention, in order to evaluate a risk level for the multi-hop routing of each CU of FIG. 8, the moving speed and direction of the interference region of the PU are obtained over time, and the moving speed and direction of the interference region of the PU are used.

The EWMA technique does not require a state diagram, unlike the Markov predictor, and requires both a moving speed and direction for the approach feature between the observed node and the sensor node.

In particular, the EWMA technique applied to the present invention is characterized in that a risk level increases in response to a moving speed if the moving speed is high when a observed node approaches a sensor node.

The moving speed $v_i(t)$ at which a observed node is approaching a specific node i may be expressed by Equation 6 below:

$$v_i(t) = \frac{d_i(t - \Delta t) - d_i(t)}{\Delta t} \quad (6)$$

In this case, $\Delta t$ is a minute time interval, and $d_i(t)$ is the distance between the node i and the observed node at time t.

The communication risk level $r_i^{(v)}(t)$ of a specific node i to which the EWMA technique has been applied may be expressed by Equation 7 below using the moving speed $v_i(t)$:

$$r_i^{(v)}(t) = \beta(v_i(t))^\gamma - (1-\beta)R_i^{(v)}(t-1) \quad (7)$$

where $\gamma$ is a value larger than or equal to 1, and $\beta$ is a value between 0 and 1.

The EWMA technique is applied in such a manner that the importance of the current speed value can be adjusted by multiplying $\gamma$ larger than or equal to 1 and $\beta$ between 0 and 1 functions as the weight.

Since the moving speed $v_i(t)$ may have a negative value or a positive value depending on the direction, $\beta(v_i(t))^\gamma$ may be rewritten as Equation 8 below when $\gamma$ is larger than 1:

$$\beta(v_i(t))^\gamma \Rightarrow \beta(\text{sgn}[v_i(t)])|v_i(t)|^\gamma \quad (8)$$

where sgn[x] denotes the sign of x, and |x| denotes the absolute value of x.

That is, Equation 7 may be rewritten as Equation 9 below using Equation 8:

$$r_i^{(v)}(t) = \beta(\text{sgn}[v_i(t)])|v_i(t)|^\gamma \quad (9)$$

where $\text{sgn}[v_i(t)]$ denotes the sign of $v_i(t)$, $\beta$ is a value between 0 and 1, and $\gamma$ determines the degree of influence on the speed and has a value larger than 1.

Figure 3:
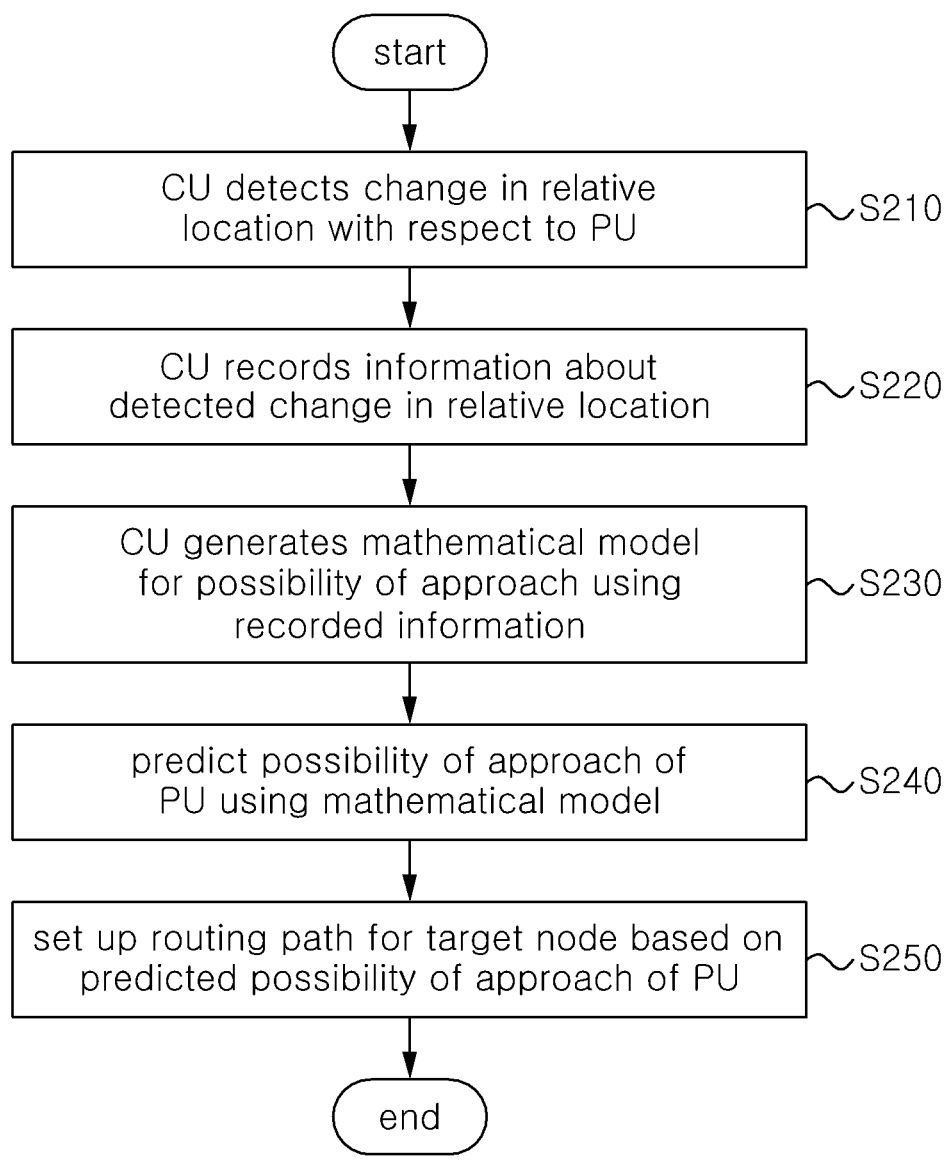
FIG. 3 is a diagram illustrating the operation flow of a routing method for a CU in the above-described cognitive radio network according to the embodiment of the present invention, based on the possibility of approach of a PU.

FIG. 3 is a diagram illustrating the conceptual operation flow of a routing method for a CU in the above-described cognitive radio network according to the embodiment of the present invention, in which the possibility of approach of a PU has been taken into account.

Referring to FIG. 3, each CU of a cognitive radio network detects a change in relative location with respect to a PU at step S210. In this case, the CU detects a change in the location of the PU using the distance between the CU and the PU and a change in distance over time.

Furthermore, the change in the relative location of the PU may be detected by sharing the location of the PU among CUs.

The CU records the detected relative location change information at step S220. Each of the CUs disposed in a distributed environment records sensing results with respect to the change in relative location detected for the CU and the PU.

The CU generates a mathematical model for the possibility of approach of the PU using the recorded relative location change information at step S230.

In this case, the mathematical model that is generated by the CU may be generated using various techniques. In the present specification, two mathematical models are disclosed as described above by way of example. The mathematical models presented as the embodiments of the present invention include a Markov prediction technique and a EWMA technique.

The CU predicts the possibility of approach of the PU using the mathematical model at step S230.

Furthermore, the CU sets up a routing path for the target node based on the predicted possibility of approach of the PU at step S240.

Figure 4:
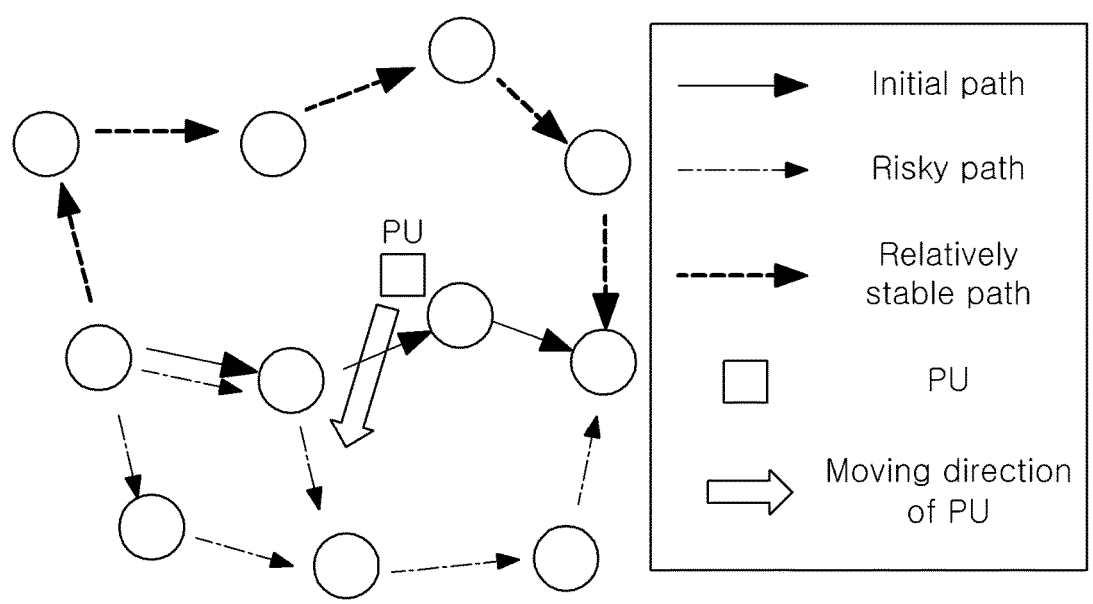
FIG. 4 is a diagram illustrating a method of setting up a routing path from a CU to a target node according to an embodiment of the present invention.

FIG. 4 is a diagram illustrating a method of setting up a routing path from the start node of CUs to a target node according to an embodiment of the present invention.

Referring to FIG. 4, an initial path from a start node to a target node is set up. The initial path refers to a routing path that is set such that a minimum cost (maximum communication efficiency, and maximum communication success rate) is incurred in the state in which a PU has not been taken into account.

In this case, each CU recognizes the possibility of approach of the PU, and calculates a communication risk level attributable to a relative mobile characteristic with respect to the PU. The CU broadcasts the calculated risk level to adjacent CU nodes, and the broadcast risk level is shared with each other. When each CU sets up a routing path, the CU sets up the routing path based on not only its own risk level but also risk levels (broadcast and received in the form of messages) with respect to adjacent CU nodes.

The CU nodes may predict the moving direction of the PU using a mathematical model, such as a Markov prediction model, an EWMA model or the like, may evaluate a corresponding risk level, may find a communication path having a minimum cost, and then may perform routing via the communication path.

FIG. 4 illustrates an initial path in which a PU has not been taken into account, a relatively stable routing path in which the PU and the moving direction of the PU have been taken into account, and a relative risky path.

In routing using relative mobile characteristics with respect to a PU and the prediction results thereof, the risk level of the occurrence of a communication failure factor attributable to the relative mobile characteristics with respect to the PU is evaluated. The evaluated risk level is considered in routing as one factor of the communication cost. Generally, the communication cost increases as the possibility of the occurrence of a communication failure or the possibility of the loss of data during communication increases. Furthermore, data transfer delay time, transfer speed, a physical distance, and the degree of occurrence of distortion and interference are considered as factors of the communication cost.

In the routing method according to the embodiment of the present invention, each cognitive node (a sensor node) sets up the most efficient communication path to a target node based on communication costs with respect to adjacent cognitive nodes. After each of the cognitive nodes has received transmission data to be transferred to a target node, the cognitive node may set up a path, having the lowest communication cost, to the target node based on itself, and transfer the transmission data to any one of the adjacent cognitive nodes along the path.

FIG. 5 is a diagram illustrating the comparison and analysis of the simulation results of cases to which the Markov Prediction technique and the EWMA technique according to the embodiments of the present invention have been applied.

Figure 5A:
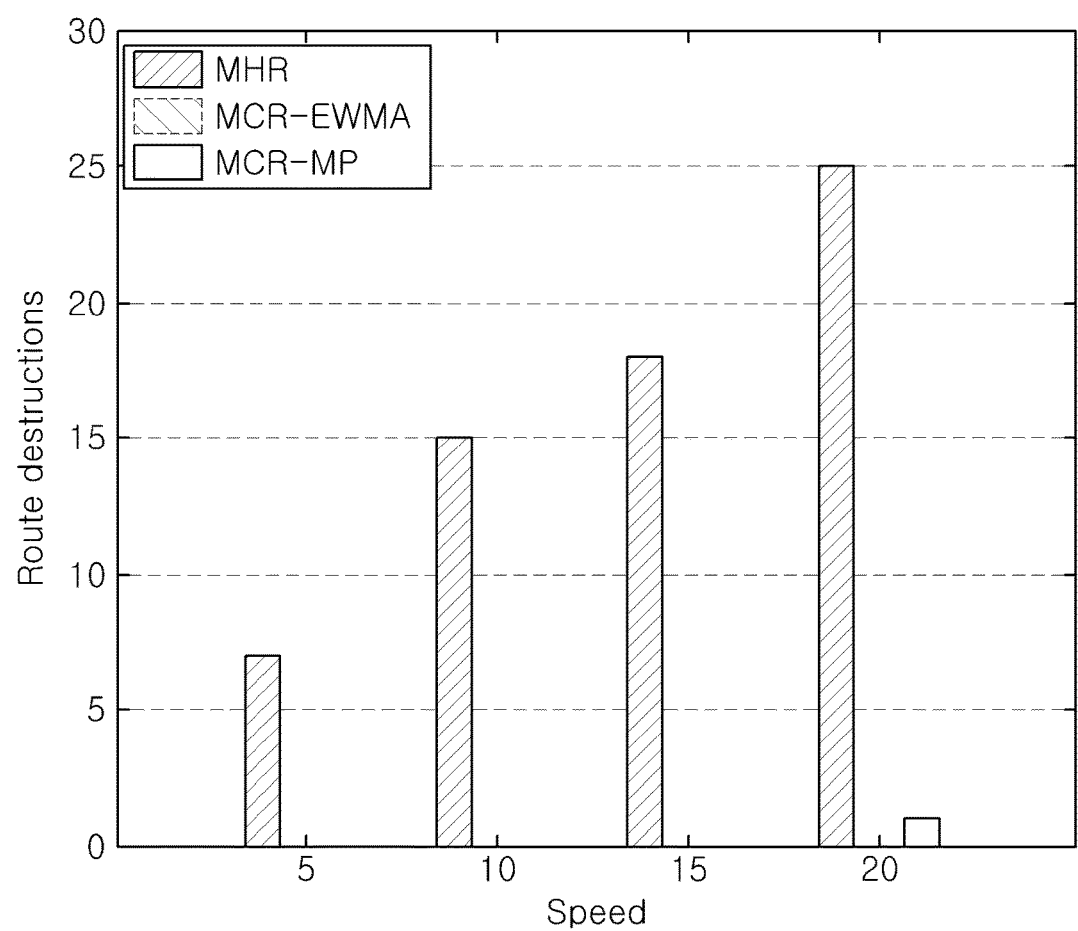
Figure 5B:
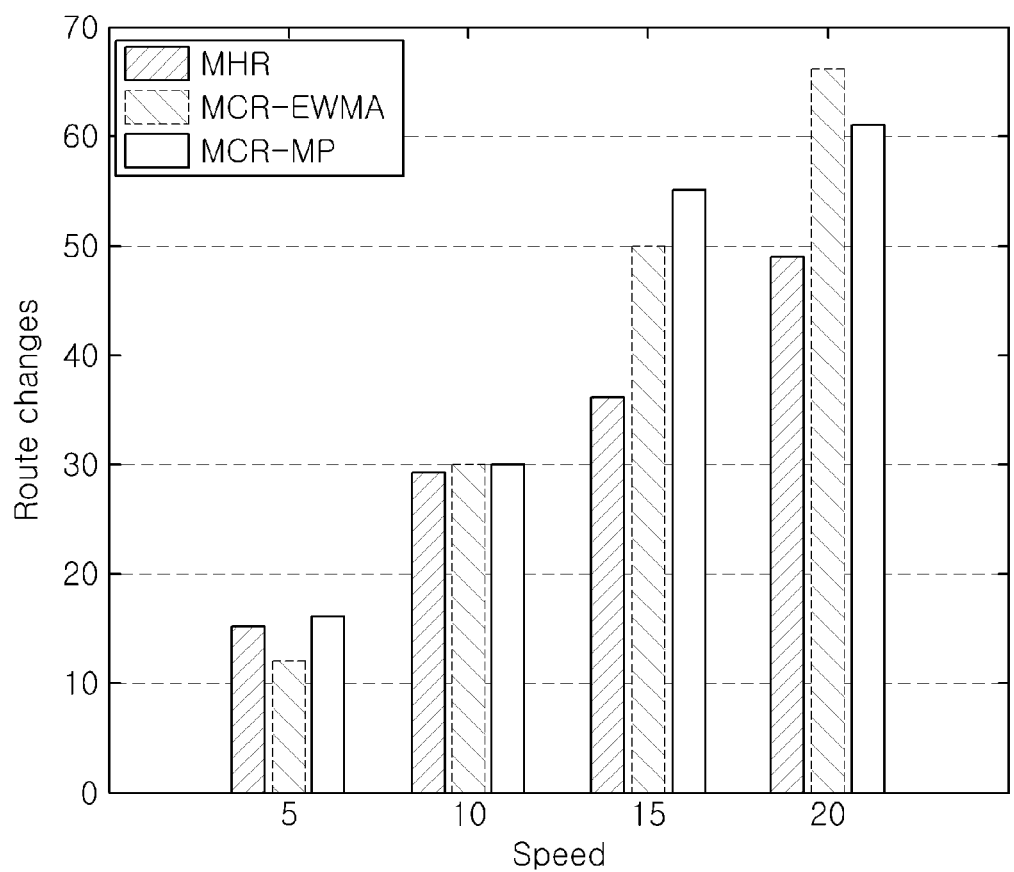

Referring to FIG. 5A through 5C, cases to which a general method of finding a routing path (the minimum hop routing (MHR) technique), the EWMA technique, and the Markov prediction technique have been applied are introduced.

MHR corresponds to the simulation results of the general method of finding a routing path, MCR-EWWA corresponds to the simulation results of the EWMA technique according to the embodiment of the present invention, in which relative mobile characteristics has been taken into account, and MCR-MP corresponds to the simulation results of the Markov prediction technique according to the embodiment of the present invention, in which relative mobile characteristics has been taken into account. In the drawing, the simulation results of the three methods are compared with each other.

The simulations were performed on the assumption that the cognitive radio network of FIG. 8 was used. In the drawing, (a) FIG. 5A denotes the number of failures of data transmission (route destructions) with respect to the moving speed of a node, (b) FIG. 5B denotes the number of changes in routing path (route changes) with respect to the moving speed of the node, and (c) FIG. 5C denotes the length of a routing path (path length) with respect to the moving speed of the node are illustrated.

The MHR, that is, a general routing technique, exhibited a phenomenon in which the number of failures of communication almost linearly increased as the moving speed of the node increased, whereas the EWMA technique and the Markov prediction technique exhibited the aspect of being robust to routing between nodes having mobility because a communication failure rarely occurred in spite of an increase in the moving speed of the node.

Meanwhile, in FIG. 5B illustrating the number of changes in routing path that occurred while the moving speed of the node was increasing, the three routing techniques exhibited similar numbers of changes in routing path in the case where the moving speed ranged from 5 to 10 m/s. That is, it may be considered that the MHR technique could not prevent communication from failing in spite of frequent changes in routing path in response to the moving speed whereas the EWMA technique and the Markov prediction technique in which relative mobile characteristics had been taken into account prevented communication from failing in such a manner than the routing path was frequently changed and communication paths were adaptively set up.

With regard to the length of the routing path, both in the case where the moving speed was high and the case where the moving was low, the MHR routing technique exhibited longer lengths, whereas the EWMA technique and the Markov prediction technique in which relative mobile characteristics had been taken into account exhibited shorter lengths. This indicates that the routing techniques of the present invention slightly increase routing paths based on the risk level but achieve the result of increasing the stability of communication.

Figure 6:
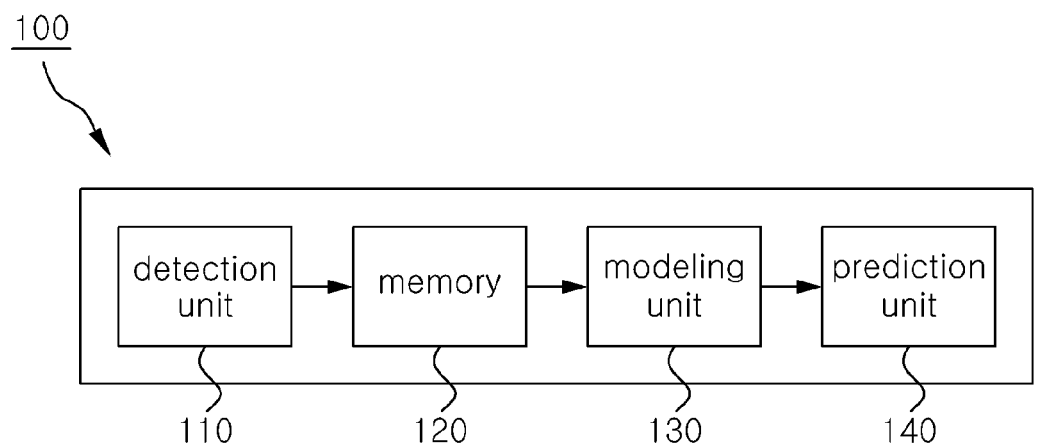
FIG. 6 is a diagram schematically illustrating the configuration of an apparatus for predicting mobility based on relative mobile characteristics on a sensor network according to an embodiment of the present invention.

FIG. 6 is a diagram schematically illustrating the configuration of an apparatus for predicting mobility based on relative mobile characteristics on a sensor network according to an embodiment of the present invention. The apparatus may be installed in a sensor node of this invention, or a CU terminal of this invention.

Referring to FIG. 6, a detection unit 110 detects a change in location representative of a change in relative location between a observed node and a sensor node within the sensor network. Since this has been described in detail above, reference is made to the above description.

Memory device 120 records information about the detected change in relative location.

A modeling unit 130 generates a mathematical model for the possibility of approach of the observed node with respect to the sensor node using the relative location change information recorded in the memory 120.

A prediction unit 140 probabilistically predicts whether the observed node will approach the sensor node using the mathematical model. Furthermore, the prediction unit 140 is characterized by predicting whether the observed node will approach using the probability that the mobility state of the observed node at a current point in time will transition to a state in which the observed node is approaching, which belongs to a plurality of mobility states within the state diagram.

The apparatus for predicting mobility, which is illustrated in FIG. 6, may be implemented as hardware included in the sensor node. The apparatus for predicting mobility may include a processor (not illustrated) and the memory device 120. The processor may include the detection unit 110, the modeling unit 130, and the prediction unit 140 as its sub-modules.

Figure 7:
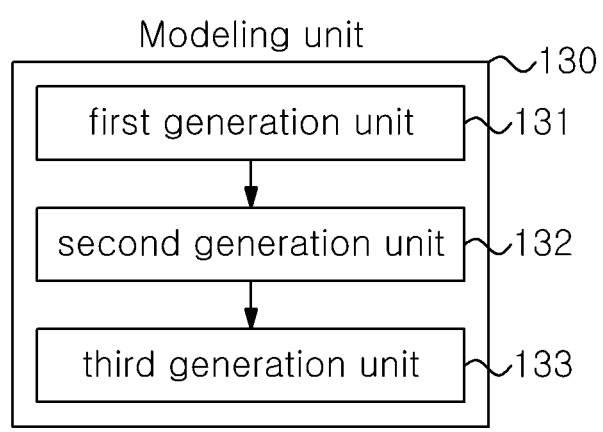
FIG. 7 is a diagram illustrating the detailed configuration of the modeling unit of FIG. 6 according an embodiment of the present invention.

FIG. 7 is a diagram illustrating the detailed configuration of the modeling unit 130 of FIG. 6 according an embodiment of the present invention.

Referring to FIG. 7, a first generation unit 131 generates the mobility state of a PU by accumulating the k pieces of relative location change information of the PU based on changes in discrete time. In FIG. 7, a case where a k-order Markov prediction model is implemented in the form of hardware is illustrated.

A second generation unit 132 generates a state diagram using combinations of a plurality of mobility states that the PU can have.

A third generation unit 133 generates a Markov model for the probabilities of transition between a plurality of mobility states within the state diagram as the mathematical model.

As an advantage of the present invention in terms of technology, the present invention probabilistically acquires relative mobile characteristics based on an environmental factor and the prediction of a target object, thereby enabling the provision of a preemptive service and the preemptive operation of a system. The present invention can contribute to the development of a communication network technology, a QoS guarantee technology, a resource assignment technology, etc.

Accordingly, the present invention can reduce the loss of data and can increase transfer rate through the implementation of preemptive resource assignment and the avoidance of a problematic factor. Furthermore, the present invention can prevent transmission delay and service delay through the provision of resources in advance.

As an advantage of the present invention in terms of industry, the present invention is a technology that can be applied to the field of information communication networks, and can contribute to not only the field of the manufacture of information communication networks but also the communication service industry through the prevention of data loss, a reduction in service time, etc.

Furthermore, the present invention is a technology that can be applied to various location-based services in the mobile service industry. The present invention can contribute to the provision of convenience to mobile users, the provision of economic benefits and the improvement of the degree of satisfaction for various experiences through a location-based advertising and marketing service, a location-based game service, etc.

The present invention can be used in various mobility- and location-based AC services between online friends and acquaintances in the social service industry. Furthermore, the present invention is a technology that can be used for various purposes, such as the prevention and avoidance of traffic accidents, the provision of road and traffic information, the prediction of congestion, etc., using relative mobile characteristics between vehicles in the automobile industry.

The present invention is a technology that can be applied to the operation of a network system against a jamming attack from a hostile country, the efficient operation among mobile tactical network systems, etc. in the field of national defense.

There are many cases where it is not necessary to determine the accurate locations of respective nodes both in terms of the functionality of a system, such as network resource assignment, etc. and in terms of a higher application layer service that is provided to mobile users. As an example, in order to preemptively avoid a communication interference phenomenon, it is sufficient if a relative mobile characteristic regarding whether a device that causes communication interference enters a predetermined range is determined without the determination of the accurate location of the device. Furthermore, as an example of a mobile service, when an advertisement or an event message is transmitted by predicting whether a mobile user is approaching a location near a specific shop, it is sufficient if a relative mobile characteristic regarding whether a target person is approaching a predetermined range from the shop is determined without the determination of the accurate location information of the target person.

For this purpose, the present invention has proposed a technology for predicting mobility based on the relative mobile characteristics of mobile users. The present technology enables distributed processing, not centralized processing, and thus is superior in terms of efficiency, cost, and rapid service time. In this technology, in order to improve the accuracy and efficiency of relative mobility prediction, first, each node records a change in the location of a target object in a distributed environment, mathematically models the possibility of approach based on the recorded change in location using a Markov prediction or EWMA technique, and probabilistically predicts a change in the relative location of the target object.

The present invention can efficiently extract only required information at a cost lower than the costs of the conventional technologies, can mathematically model the extracted information, and then can accurately predict the possibility of approach of a observed node.

Furthermore, the present invention can be applied to various types of networks without limitations on the types and range of applicable networks, unlike the conventional technologies. The present invention can be applied to any type of network as long as each node of the network has independent computational processing capability and transmission and reception capability. In particular, the conventional technologies consider a observed node to be a target of avoidance, and evaluate the possibility of approach with respect to a observed node as a risk in terms of communication. In contrast, the present invention can be also applied to a case where the approach of a observed node is considered to be a preferred event.

The method of predicting mobility based on relative mobile characteristics and the method and apparatus for the routing of a CU on a cognitive radio network according to the embodiments of the present invention may be implemented in the form of program instructions that are executable by various types of computer means, and may be recorded in a computer-readable storage medium. The computer-readable storage medium may include program instructions, data files, and data structures either independently or in combination. The program instructions stored in the medium may be designed and configured especially for the present invention or may be known to and usable by those skilled in the art of computer software. Examples of the computer-readable storage medium may include a magnetic medium, such as a hard disk, a floppy disk, or magnetic tape, an optical medium, such as CD-ROM or a DVD, a magneto-optical medium, such as a floptical disk, and a hardware apparatus, such as ROM, RAM, or flash memory which is especially configured to store and execute the program instructions. Examples of the program instructions include not only such machine language code that is created by a compiler, but also such high-level language code that is executable by a computer using an interpreter or the like. The hardware apparatus can be configured to function as one or more software modules so as to perform the operation of the present invention, and vice versa.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

The present invention was contrived based on research that was conducted as part of the university IT research center promotion project and the general researcher promotion project sponsored by the Korean Ministry of Science, ICT and Future Planning, the Korean Ministry of Education, the National IT Industry Promotion Agency and the National Research Foundation of Korea [project management number: NIPA-2013-(H0301-12-2003) and 2013R1A1A2009569; project title: Research into National Defense IT Tactical Communication Technology, and Cognition-based Adaptive and Preemptive Data Networking Technique in Mobile Environment].

What is claimed is:

1. A method of predicting mobility based on relative mobile characteristics, comprising:
   detecting, by each of a plurality of sensor nodes of a sensor network including the plurality of sensor nodes, a change in relative location with respect to an observed node;
   recording, by the each of the plurality of sensor nodes, information about the detected change in relative location;
   generating, by the each of the plurality of sensor nodes, a mathematical model for a possibility of approach of the observed node with respect to the each of the plurality of sensor nodes using the recorded relative location change information; and predicting probabilistically, by the each of the plurality of sensor nodes, whether the observed node will approach the each of the plurality of sensor nodes using the mathematical model, wherein the generating comprises:

generating a mobility state of the observed node by accumulating k pieces of relative location change information of the observed node based on changes in discrete time;

generating a state diagram using combinations of a plurality of mobility states that the observed node can have; and generating a Markov model for probabilities of transition between a plurality of mobility states within the state diagram as the mathematical model.

2. The method of claim 1, wherein the recording comprises recording the relative location change information so that information about whether the observed node is approaching or moving away from the each of the plurality of sensor nodes is included in the recorded relative location change information.

3. The method of claim 1, wherein the predicting comprises predicting whether the observed node will approach using a probability of transition that a mobility state of the observed node at a current point in time will be a state in which the observed node is approaching in next time, which belongs to a plurality of mobility states within the state diagram.

4. A method of routing for a cognitive user (CU) in a cognitive radio network, comprising:

detecting, by the CU in the cognitive radio network, a change in relative location with respect to a primary user (PU);

recording, by the CU, information about the detected change in relative location;

generating, by the CU, a mathematical model for a possibility of approach of the PU using the recorded relative location change information;

predicting, by the CU, a possibility of approach of the PU using the mathematical model; and setting up, by the CU, a routing path for a target node based on the predicted possibility of approach of the PU, wherein the generating comprises:

generating a mobility state of the PU by accumulating k pieces of relative location change information of the PU based on changes in discrete time;

generating a state diagram using combinations of a plurality of mobility states that the PU can have; and generating a Markov model for probabilities of transition between a plurality of mobility states within the state diagram as the mathematical model.

5. The method of claim 4, wherein the predicting comprises predicting whether the CU will approach using a probability of transition that a mobility state of the CU at a current point in time will be a state in which the CU is approaching in next time, which belongs to a plurality of mobility states within the state diagram.

6. The method of claim 4, wherein the generating comprises generating an exponentially weighted moving average of a relative approaching speed of the PU as the mathematical model.

7. The method of claim 4, wherein the setting up comprises:

calculating communication costs, including the predicted possibility of approach of the PU, for paths via each of nodes adjacent to the CU; and selecting one of the paths via each of nodes adjacent to the CU as the routing path based on the calculated communication costs.

8. The method of claim 4, further comprising:

broadcasting, by the CU to an adjacent CU, the predicted possibility of approach of the PU; and receiving a broadcast message, including a possibility of approach of the PU with respect to the adjacent CU, from the adjacent CU, the possibility of approach of the PU with respect to the adjacent CU being predicted by the adjacent CU;

wherein the setting up comprises setting up the routing path with respect to the target node based on the predicted possibility of approach of the PU and the received possibility of approach of the PU with respect to the adjacent CU.

9. An apparatus for predicting mobility based on relative mobile characteristics, comprising:

a processor configured to detect a change in relative location between an observed node and a sensor node within a sensor network; and a memory device configured to record information about the detected change in relative location;

wherein the processor is further configured to:

generate a mathematical model for a possibility of approach of the observed node with respect to the sensor node using the relative location change information recorded in the memory device;

generate a mobility state of the observed node by accumulating k pieces of relative location change information of the observed node based on changes in discrete time;

generate a state diagram using combinations of a plurality of mobility states that the observed node can have;

generate a Markov model for probabilities of transition between a plurality of mobility states within the state diagram as the mathematical model; and predict probabilistically whether the observed node will approach the sensor node using the mathematical model.

10. The apparatus of claim 9, wherein the processor is further configured to:

predict whether the observed node will approach using a probability of transition that a mobility state of the observed node at a current point in time will be a state in which the observed node is approaching in next time, which belongs to a plurality of mobility states within the state diagram.

* * * * *